No. 715,526. Patented Dec. 9, 1902.
O. TYBERG.
ADJUSTING DEVICE FOR SPINDLES.
(Application filed Oct. 4, 1899.)
(No Model.)
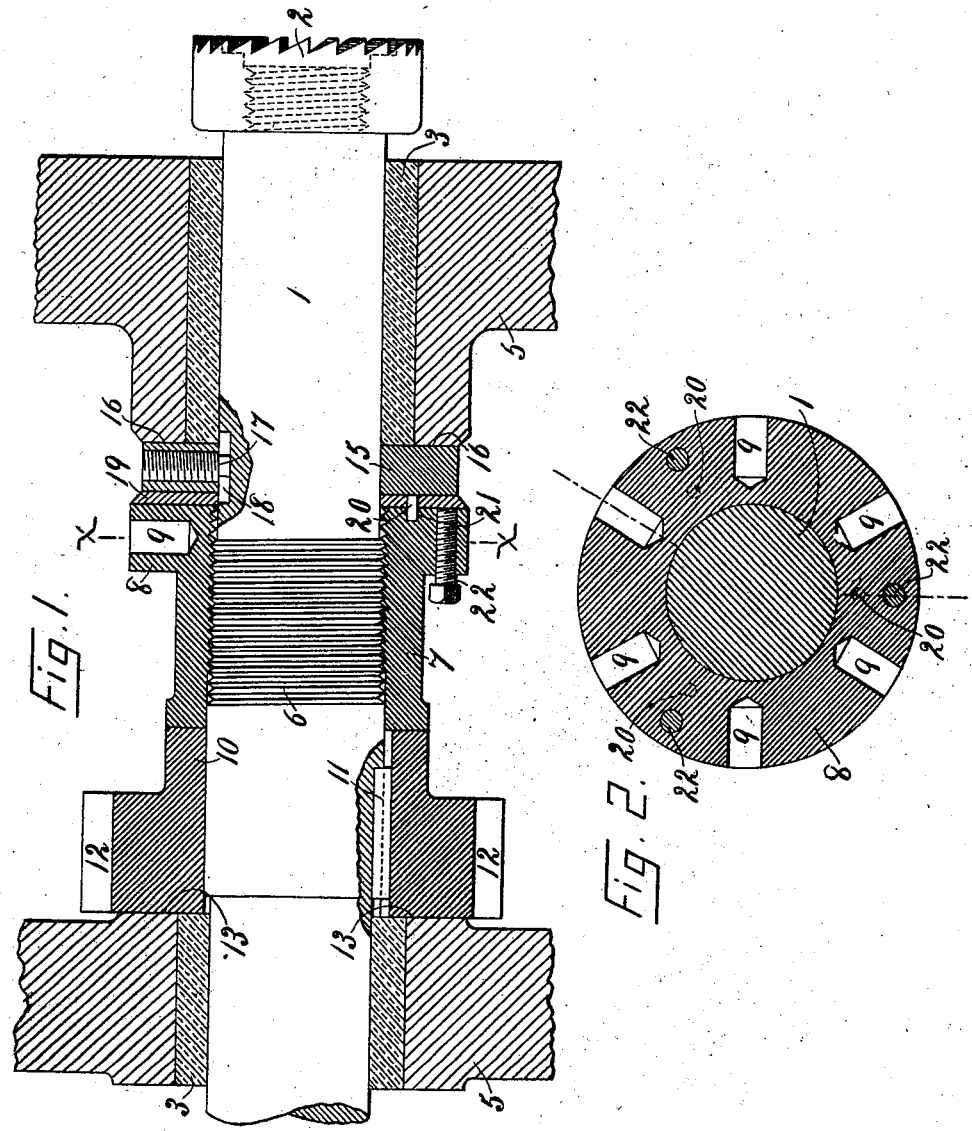
WITNESSES:
INVENTOR

UNITED STATES PATENT OFFICE.

OLUF TYBERG, OF BROOKLYN, NEW YORK, ASSIGNOR TO RUSSELL, BURDSALL & WARD BOLT & NUT COMPANY, OF PORT CHESTER, NEW YORK, A CORPORATION OF NEW YORK.

ADJUSTING DEVICE FOR SPINDLES.

SPECIFICATION forming part of Letters Patent No. 715,526, dated December 9, 1902.

Application filed October 4, 1899. Serial No. 732,541. (No model.)

*To all whom it may concern:*

Be it known that I, OLUF TYBERG, a citizen of the United States of America, and a resident of the borough of Brooklyn, county of Kings, and State of New York, have invented certain new and useful Improvements in Adjusting Devices for Spindles, of which the following is a specification.

This invention relates to an improvement in adjusting devices for spindles shown as applied in connection with end or butt milling-tools; and its object is to provide a simple device of this character carried by the spindle whereby the finest longitudinal adjustment of the latter may readily be made.

The invention consists of the employment of two collars rotating with the spindle and having a limited longitudinal motion thereon, a nut placed on said spindle between said collars for adjusting the spindle endwise, a disk interposed between one of said collars and the nut, and means for taking up the wear of said collars.

The invention will be hereinafter fully described, and specifically set forth in the annexed claims.

In the accompanying drawings, Figure 1 is a longitudinal sectional view of the device, taken on the broken lines of Fig. 2; and Fig. 2 is a cross-section on the line X X in Fig. 1.

In the construction of my invention I employ a spindle 1, which carries the tool 2, fixed thereto in any preferred manner. This spindle turns in bushes 3 3, fixed in the head-stock 5 of the machine. A portion of the spindle between the bearings is slightly enlarged, and upon this enlarged portion the thread 6 is cut. A nut 7, provided at one end with a flange 8, is threaded upon the spindle between the bearings. A series of holes 9 9 are drilled radially in the periphery of this flange and are adapted to be used in connection with a spanner-wrench in turning the nut upon the spindle. The smaller end of this nut bears against a collar 10, fitted loosely on a spline 11, fixed in the spindle, the spline being shorter than the collar in order to permit the latter to have a limited longitudinal movement on the spindle. A driving-gear 12 may be formed integrally with said collar, as shown, if preferred; but it is obvious that a plain band-collar may be used and the spindle driven by an overhanging pulley or in other suitable manner. This collar has a bearing-face 13, which contacts with and rotates on one of the faces of the head-stock. A second collar 15 is mounted on the spindle at the other side of the nut 7 and has a bearing-face 16 contacting with and rotating on one of the faces of the head-stock. This collar is provided with a threaded key 17, which has a sliding fit in a longitudinal keyway 18, milled in the periphery of the spindle. This slot is of sufficient length to permit a limited longitudinal movement of the collar on the spindle. Interposed between this collar 15 and the flange 8 of the nut 7 is the disk 19, provided with a series of pins 20 20, projecting into suitable apertures 21 in the flange 8. The object of these pins is to prevent the disk from turning upon the spindle except when the nut is turned. A series of set-screws 22 22 are threaded through the flange 8 and their respective ends bear against the disk 19, which in turn bears against the collar 15.

In the operation of the device, the several parts being in the position shown in Fig. 1, if it is found necessary to adjust the spindle longitudinally a spanner-wrench is applied to the flange and the spindle screwed to its exact position. If there is any slack between the bearings, it is taken up by means of the set-screws 22 22. The collars, nut, and disk all retain their relative positions while the spindle is running and cannot be displaced without turning the nut with a wrench.

Having thus described my invention, what I claim as new, and desire to secure by Letters Patent, is—

1. In a spindle-adjusting device, the combination of a spindle mounted in bearings, an adjusting-nut threaded on the spindle between the bearings, and collars splined to the spindle between the ends of the nut and bearings.

2. In a spindle-adjusting device, the combination of a spindle mounted in bearings, an adjusting-nut threaded on the spindle between the bearings, collars splined to the spindle between the ends of the nut and the bearings, and a disk carried by the nut and interposed between it and one of the collars.

3. In a spindle-adjusting device, the combination of a spindle mounted in bearings, an adjusting-nut threaded on the spindle between the bearings, collars splined to the spindle between the ends of the nut and the bearings, a disk carried by the nut and interposed between it and one of the collars and means for adjusting the relation of the nut and disk axially to take up wear.

4. In a spindle-adjusting device, the combination of a spindle mounted in bearings, a flanged adjusting-nut threaded on the spindle between the bearings, collars splined to the spindle between the ends of the nut and the bearings, a disk carried by the nut and interposed between the flange of the nut and one of the collars and adjusting-screws in the flange bearing against the disk.

5. In a spindle-adjusting device, the combination of a spindle, two bearings in which the spindle rotates, an adjusting-nut threaded on the spindle between the bearings, and collars mounted on the spindle to turn with it and interposed between the faces of the respective bearings and the ends of the nut.

6. In a spindle-adjusting device, the combination of a spindle, two bearings in which the spindle rotates, an adjusting-nut threaded on the spindle between the bearings, collars mounted on the spindle to turn with it and interposed between the faces of the respective bearings and the ends of the nut, and means of adjustment to compensate wear between the collars and bearings.

Signed by me this 29th day of September, 1899.

OLUF TYBERG.

Witnesses:
U. WAHLSTROM,
M. I. GIEL.